United States Patent [19]
Skelton et al.

[11] Patent Number: 6,067,018
[45] Date of Patent: May 23, 2000

[54] LOST PET NOTIFICATION SYSTEM

[75] Inventors: Joan M. Skelton, 230 W. Paces Ferry Rd., Atlanta, Ga. 30305; Kenneth E. Myers, Marietta, Ga.

[73] Assignee: Joan M. Skelton, Atlanta, Ga.

[21] Appl. No.: 09/218,004

[22] Filed: Dec. 22, 1998

[51] Int. Cl.[7] .................................................. G08B 21/18
[52] U.S. Cl. ...................... 340/573.3; 119/721; 119/859; 119/908
[58] Field of Search .................. 340/573.3; 119/859, 119/721, 908

[56] References Cited

U.S. PATENT DOCUMENTS

| | | | |
|---|---|---|---|
| 3,336,530 | 8/1967 | Sloan et al. | 119/859 |
| 4,612,719 | 9/1986 | de Jong | 119/859 |
| 4,762,088 | 8/1988 | Chapman et al. | 119/859 |
| 4,850,031 | 7/1989 | Allsop et al. | 340/573.1 |
| 5,036,610 | 8/1991 | Fehr | 40/300 |
| 5,210,532 | 5/1993 | Knoedler et al. | 340/573.1 |
| 5,266,944 | 11/1993 | Carroll et al. | 340/825.36 |
| 5,307,763 | 5/1994 | Arthur et al. | 119/718 |
| 5,337,041 | 8/1994 | Friedman | 340/573.3 |
| 5,355,839 | 10/1994 | Mistry | 119/858 |
| 5,381,129 | 1/1995 | Boardman | 340/573.3 |
| 5,454,350 | 10/1995 | Betheil | 119/858 |
| 5,515,033 | 5/1996 | Matarazzo | 340/573.3 |
| 5,521,582 | 5/1996 | Kingston | 340/539 |
| 5,525,967 | 6/1996 | Azizi et al. | 340/573.1 |
| 5,552,772 | 9/1996 | Janky et al. | 340/573.1 |
| 5,570,081 | 10/1996 | Holstrom | 340/573.1 |
| 5,574,432 | 11/1996 | McCarthy | 340/573.1 |
| 5,603,094 | 2/1997 | Greear, Jr. | 340/573.3 |
| 5,640,147 | 6/1997 | Chek et al. | 340/573.1 |
| 5,652,570 | 7/1997 | Lepkofker | 340/573.1 |
| 5,708,421 | 1/1998 | Boyd | 340/573.3 |
| 5,808,551 | 9/1998 | Yarnall, Jr. et al. | 340/573.3 |
| 5,868,100 | 2/1999 | Marsh | 340/573.3 |
| 5,949,350 | 9/1999 | Girard et al. | 340/573.3 |
| 5,955,953 | 9/1999 | Hanson et al. | 340/573.3 |

FOREIGN PATENT DOCUMENTS

| | | |
|---|---|---|
| 0 421 647 A2 | 4/1991 | European Pat. Off. . |
| 0 589 533 B1 | 3/1994 | European Pat. Off. . |
| WO 97/27499 | 7/1997 | WIPO . |
| WO 98/01023 | 1/1998 | WIPO . |

*Primary Examiner*—Glen Swann
*Attorney, Agent, or Firm*—Jones & Askew, LLP

[57] ABSTRACT

The lost pet notification system includes three elements: a pet collar that automatically activates an alarm once the pet becomes lost, a portable hand held unit that continually monitors the location of the pet, and a base station that automatically transmits a signal to the owner once the portable unit determines that the pet is lost. The pet collar continually receives a polling signal from the portable unit while the pet is within transmission range of the portable unit. In response to each polling signal, the pet collar transmits a reply signal to the portable unit. Once the polling signal can no longer be detected by the pet collar, the pet collar automatically activates an alarm. In addition, the portable unit activates an alarm and also transmits a notification signal to the base station. Once the notification signal is received, a the base station automatically places a telephone call to the predetermined telephone number and plays the associated message to alert the pet owner that the pet is lost. If the pet comes back within the transmission range of the portable unit, the portable unit transmits a second notification signal to the base unit which will places a second call to the owner to notify him or her that their pet is safe. The invention may also include advanced features such as a paging unit for receiving information, a global positioning device, a RF beacon transmitter, and cellular telephone emulator to transmit information to a monitoring station.

33 Claims, 11 Drawing Sheets

6,067,018

LOST PET NOTIFICATION SYSTEM

TECHNICAL FIELD

This invention relates to remote monitoring systems and, more particularly, relates to a pet collar that automatically activates an alarm when the pet becomes lost, and an associated system that automatically notifies the pet's owner when the pet becomes lost.

BACKGROUND OF THE INVENTION

Making sure that a pet is safe and secure is a concern for all pet owners. Keeping a pet safe and secure often requires monitoring the pet's location to make sure that the pet has not become lost. In particular, a pet owner typically needs to monitor the location of his or her pet both when the pet is left unattended, such as when the owner goes to work, and the owner takes the pet to a public place, such as on a walk or to the park. To ensure the pet's safety, pet owners have traditionally restrained their pets by keeping them within a confined area or secured by a leash. But many pets still stray from home or run off in public places and become lost. In many cases, the pet owner may not become aware that the pet is missing for an extended period of time.

For example, most pet owners regularly leave their pets at home when they go to work and many other places where pets are not welcome. In some cases, the pet may be left unattended for many hours or even several days. If the pet strays from home and becomes lost while the owner is away, it may be many hours or even days before the pet owner learns that the pet has become lost. The longer the owner is unaware that their pet is missing, the harder it becomes to quickly locate and retrieve the pet. A long delay in locating the pet also increases risk of injury to the pet, which often translates into greater anxiety for the owner.

Monitoring the pet's location may also be a concern when the owner takes the pet to public places, such as on a walk or to the park, where the pet may become distracted and run off. Many dogs, for example, have chased cats, cars, or other dogs only to become temporarily lost, causing their owners to search until the pets are found. Again in this situation, the longer the owner is unaware that the pet is missing, the harder it becomes to locate and retrieve the pet.

Most devices currently available for locating lost pets involve passive devices, such as dog collars imprinted with the owner's name, address, and telephone number. These devices require the assistance of other individuals to locate and return the pet. Although these devices are helpful, they do not meet the pet owner's need for automatic notification when a pet strays from home or runs off in public.

Active pet collars have been developed to help notify passersby that a pet is lost. For example, some pet collars allow the pet owner to remotely activate a visual display located on the collar, such as an inflatable balloon inscribed with the message "LOST PET," flashing lights, or an electronic display. Although these systems may help to recover the pet once the owner becomes aware that the pet is missing, they do not alert the owner that the pet has become lost. As a result, the pet may be lost for an extended period before the owner realizes that the pet is lost and activates the visual display.

Other systems have been developed to help track lost or missing pets. For example, pet-tracking systems used in falconry and hunting use radio frequency transmitters that send homing signals to portable units held by the owners. While these systems are useful once the owner begins to track the lost pet, they do not notify the owner when the pet initially becomes lost. In addition, if the homing transmitter becomes active before the owner is ready the search for the pet, the battery in the homing transmitter may run down before the owner has a chance to search for the lost pet.

Automatic notification systems have been developed for imposing "house arrest" for convicted criminals. These systems use a transmitter "tag" or "collar" to continually send a signal to a monitoring station located within the criminal's home. When the signal is interrupted, the monitoring station automatically places a telephone call to the police station to notify the authorities that the prisoner has left the prescribed area. Although this type of automatic notification system could be used to monitor the location of a pet left unattended at home, it does not provide a mechanism for monitoring the location of the pet away from home, for example when taking the pet for a walk or to the park.

Alarm devices have also been developed for monitoring infant children in public places, such as shopping malls and fair grounds. A harness-type unit worn by the child continually transmits a signal to a hand-held monitoring station carried by the parent. When the child wanders out of range, the monitoring station sounds an alarm. The parent may then remotely activate an alarm located on the child unit to alert passersby that the child is lost. Lights attached to the child unit may also assist the parent in locating the child. Although these systems are helpful in tracking lost children, they do not anticipate the needs of pet owners, such as leaving pets unattended for hours or even several days.

Thus, there is a general need in the art for a pet monitoring system that is useful when the owner leaves the pet unattended, and is also useful when the owner takes the pet to a public place, such as to the park on a walk.

SUMMARY OF THE INVENTION

The present invention meets the above-described needs by providing an automatic lost pet notification system that includes a pet collar, a portable unit, and a base station. The portable unit continually sends a polling message to the pet collar, which sends a reply message to the portable unit. To notify passersby that the pet is lost, the pet collar automatically activates an alarm when it fails to receive a polling message for the predetermined period of time. The portable unit also automatically activates an alarm to notify a pet owner carrying the portable unit that the pet is lost. The base station, which plugs into household electrical and communication outlets (e.g., telephone jack), may be programmed with one or more recipient identifiers (e.g., telephone numbers) and associated messages.

If the portable unit is located in the base station when the alarm activates, the base station automatically places one or more notification communications (e.g., telephone calls) and plays the associated messages to notify a pet owner who is away from home that the pet is lost. For example, the base station may automatically place a telephone call to a pager carried by the pet owner and transmit a predefined alert code, such as "999-9999." Alternatively, the base station may automatically transmit an e-mail notification communication via the Internet, broadcast a short- or long-range radio frequency notification message, send a notification communication via a closed-circuit security system, or transmit another type of suitable notification communication. For convenience, notification communications are referred to a telephone calls in the following description; but those skilled in the art will understand that that equivalent procedures could be implemented for transmitting other types of notification communications.

When the pet is at home, the owner places the portable unit in the base station, which charges a battery in the portable unit. In this mode, the pet monitoring and notification system is useful when the pet has been left at home unattended, for example when the owner goes to work. If the pet should become lost, the pet collar automatically activates its alarm, and the base station places a telephone call or calls to notify the owner that the pet is lost. The owner may also remove the portable unit from the base station and take it along when taking the pet away from home. In this mode, the pet monitoring and notification system is useful when with the pet owner takes the pet to a public place, such as for a walk or to the park. If the pet becomes lost, the portable unit activates an alarm to alert the owner.

In both the at-home and the away-from-home modes, the pet owner is notified immediately when the pet becomes lost, which will hopefully reduce the amount of time between the pet becoming lost and the owner starting to search for the lost pet. In addition, the pet collar automatically activates an alarm on the pet collar when the pet becomes lost. That is, the owner does not have to take any action to activate the alarm on the collar. This reduces the amount of time between the pet becoming lost and the activation of the alarm, which may increase the likelihood of passersby safely and quickly finding the pet and alerting the pet's owner. In addition, the base station may be embodied in a relatively inexpensive device that plugs directly into household electrical and telephone outlets or other communication jacks, such as computer ports.

Generally described, the present invention provides a system for monitoring the location of a pet including a pet collar, a portable unit, and a base station. The pet collar receives a polling signal generated by the portable unit and, in response, transmits a reply signal back to the portable unit. If the pet collar fails to receive a polling signal within a predefined period, the pet collar automatically activates an alarm on the pet collar to notify persons nearby that the pet is lost. The alarm may include a loud, periodic sound to attract the attention of person nearby. In conjunction with the audible alert, the alarm may also include one or more bright lights attached to the collar and a display device that can display text and/or numeric messages.

The portable unit continually generates the polling signal at periodic intervals regardless of whether the pet collar is within the transmission range of the portable unit. Once the portable unit fails to detect a reply signal in response to a predetermined number of polling signals, it also activates an alarm to notify the pet owner that the pet has strayed. The alarm on the portable unit may contain a loud periodic sound, one or more bright lights, and a display device to display stored messages. In addition, when the portable unit is located in the base station, the portable unit transmits a notification signal to the base station, which automatically places a notification communication (e.g., telephone call) to one or more predetermined telephone numbers. For example, the base station may place a telephone call to the owner's work number or to the owner's pager number, or any other telephone number where the owner or another responsible person might be located to alert them through the notification communication that the pet is missing.

Any recipient of a notification communication may reply with a predetermined acknowledgement code, such as **9, which will cause the base station to discontinue the notification procedure. In addition, if the pet returns to within transmission range of the portable unit, the collar will again detect the polling signal and generate a reply signal. The portable unit receives the reply signal, discontinues its alarm condition, and transmits a second notification signal to the base station to indicate that the pet has returned. Upon receiving the second notification signal, the base station automatically generates a telephone call to every number that was called in response to the first notification signal and plays a prerecorded message indicating that the pet is no longer lost. If the pet cycles into and out of transmission range a predetermined number of times and/or within a predetermined time period, the base station may discontinue notification communications to avoid annoying recipients with multiple notifications, for example if the pet has learned to easily exit and reenter the transmission range (e.g., jump a fence).

In addition to the basic system described above, the pet collar may also contain a paging receiver. Upon receiving notice that his or her pet is lost, the pet owner may transmit a paging signal to the collar, typically by placing a telephone call to a directory number associated with the collar. The paging signal may include a telephone number where the owner can be reached. A display device on the collar displays the number along with a message, such as "LOST PET, PLEASE CALL (XXX) XXX-XXXX." This feature allows the pet owner to determine which telephone number is displayed on the collar, which may be useful if the pet becomes lost while away from home, for instance on vacation.

The pet collar may also contain a global positioning device and a bi-directional cellular paging device. In this case, the pet owner may activate the global positioning device by transmitting a paging signal to the paging unit on the pet collar. The collar receives global positioning information from satellites or other broadcasting stations, triangulates this information to determine the coordinates where the collar is located, and periodically transmits the coordinates to the pet owner or a tracking station using the paging device. To conserve battery power within the collar, the global positioning function is not activated until the owner transmits an initial paging signal. In addition, the pet owner can turn off the global positioning function by transmitting a subsequent paging signal to the pet collar.

The pet collar may also contain a beacon transmitter that generates a homing signal. When the owner is ready to track the pet, the owner activates the beacon transmitter by placing a paging signal to the paging unit on the collar. The collar then transmits the beacon signal until the owner transmits a subsequent paging signal to discontinue the homing function. Again to conserve battery power within the collar, the homing function is not activated until the owner transmits an initial paging signal. A directional strength-of-signal receiver located in the portable unit detects the homing signal and displays a signal representative of the strength and direction of the homing signal.

As an alternative to the global positioning device and the beacon transmitter, the paging unit may periodically transmit a signal on the overhead data channel of the wireless telephone network. For example, the paging unit may emulate a registering cellular telephone by periodically transmitting an autonomous registration message. These registration signals may be detected by a plurality of cellular receivers, which determine the strength of the signal at each cellular receiver. The cellular system uses this information to determine the approximate position of the pet collar, and forwards the location information to the pet owner, who tracks the pet. In addition, the directional strength-of-signal receiver in the portable unit may use the periodic autonomous registration messages transmitted by the paging device as the homing signal. In addition, the Federal Communications Commission has mandated that wireless telephones be generally locatable by the year 2000. Although the technologies that will be deployed in response to this mandate cannot be known at this time, it should be understood that the present invention may be modified to perform positioning using whatever technology may be implemented to satisfy the mandate.

That the invention improves over the drawbacks of prior lost pet notification systems and accomplishes the advantages described above will become apparent from the following detailed description of the exemplary embodiments and the appended drawings and claims.

DETAILED DESCRIPTION OF EMBODIMENTS OF THE INVENTION

Figure 1:
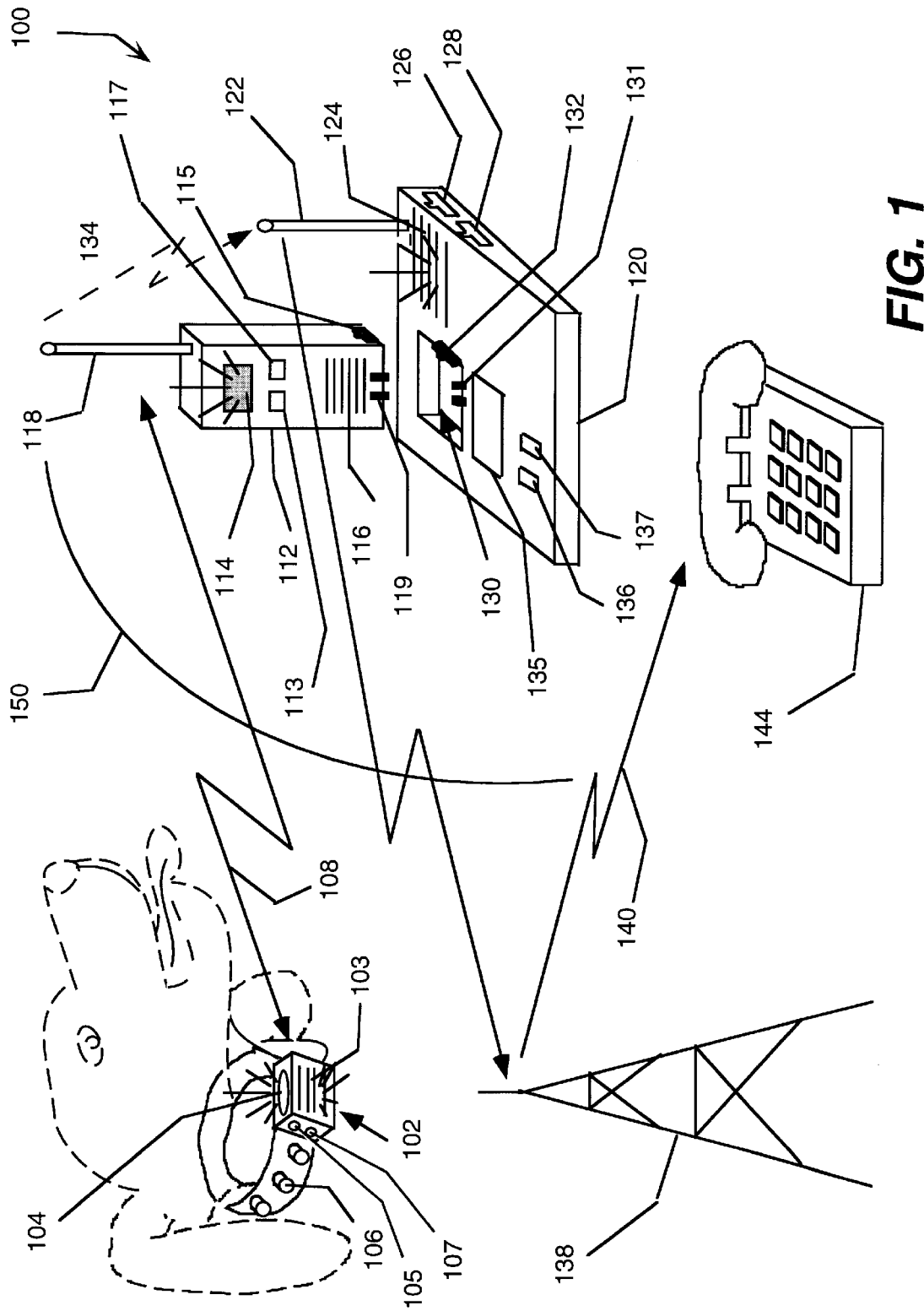
FIG. 1 is a system overview illustrating a lost pet notification system according to an embodiment of the invention.

The present invention may be embodied in a lost pet notification system including three elements: a pet collar that automatically activates an alarm once the pet becomes lost, a portable hand held unit that continually monitors the location of the pet and automatically activates an alarm once the pet becomes lost, and a base station that automatically places one or more telephone calls to notify the owner once the portable unit determines that the pet is lost. The base station, which plugs into household electrical and telephone outlets, may be programmed with one or more telephone numbers and associated messages. When the pet is left unattended at home, the portable unit may be placed in the base station, which charges a battery in the portable unit. When the owner takes the pet away from home, the portable unit may be removed from the base station and taken along.

As used in this specification, a telephone call may be a voice-channel telephone call, or a data-channel telephone call, such as a paging call. In addition, the base unit may alternatively be configured to place lost pet notification communications using other types of communication channels, such as long- or short-range radio-frequency transmission, electronic mail sent over a computer network such as the Internet, a notification communication sent to an alarm monitoring station, and so forth. In this case, the telephone numbers stored in the base unit may be replaced by appropriate recipient identifiers, such as e-mail addresses, message headers, and the like.

The pet collar contains a transceiver that continually receives a polling signal from the portable unit. In response to each polling signal, the pet collar transmits a reply signal to the portable unit. This handshaking mode continues while the pet collar and the portable unit are within transmission range of each other. Once the pet moves out of transmission range and fails to receive a predetermined number of polling signals, the pet collar automatically activates an alarm. The alarm typically includes a set of low power signaling devices designed to attract the attention of passersby. For example, the alarm may include a high pitch periodic chirping sound to alert passersby that the pet is lost. The alarm may also include a visual notification, such as a number of light emitting diodes (LEDs) affixed to the outside of the pet collar. The visual notification system may also include a display device, such as a liquid crystal display (LCD), LED matrix, small video display or other device suitable for displaying a message, such as "LOST PET, PLEASE CALL (XXX) XXX-XXXX."

Although the pet collar is typically placed around a neck of the pet, it could alternatively be configured as a harness, a sweater, or another type of pet garment. In addition, the pet collar may include a tag with a predetermined telephone number (e.g., 1-800 directory number) for reaching a central monitoring station. In this case, the pet owner may register the telephone number or e-mail address where the owner can be reached with the monitoring station, which will forward information received from the pet collar on to the pet owner using the registered telephone number or e-mail address.

Once the pet collar leaves the transmission range of the portable unit, the pet collar no longer sends reply signals to the portable unit. When the portable unit fails to receive reply signals to a predetermined number of polling signals, the portable unit automatically activates an alarm. The alarm in the portable unit may include a periodic chirping sound to alert the owner that the pet has traveled beyond the transmission range. The portable unit may also contain LEDs that, when activated, visually alert the owner that the pet is lost. The alarm in the portable unit may also include a display device, such as an LCD, LED matrix, small video display or other device suitable for displaying a message, such as "ATTENTION, YOUR PET IS LOST."

Once an alarm is activated, if the portable unit is located in the base station, it transmits a notification signal to the base station, which executes a series of predetermined commands stored in memory. Specifically, the base station retrieves a telephone number stored in the computer's memory and an associated prerecorded message. The base station automatically places a notification communication (e.g., telephone call) using the predetermined recipient identifier (e.g., telephone number) and plays the associated message to alert the pet owner that the pet is lost. The base station may repeat this process for up to five stored telephone numbers. Each message is typically transmitted to either a telephone unit or to a paging unit. For example, the base station may automatically place a telephone call to a pager carried by the pet owner and transmit a predefined alert code, such as "999-9999." Any recipient of a notification communication may reply with a predetermined acknowledgement code, such as **9, which will cause the base station to discontinue the notification procedure.

If the pet returns to within transmission range of the portable unit, the collar will again detect the polling signal sent by the portable unit. In response, the pet collar will again transmit a reply signal to the portable unit. Upon receiving the reply signal, the portable unit determines whether an alarm condition was detected prior to receiving the reply signal. If an alarm condition was detected, the portable unit transmits a second notification signal to notify the base station that the pet has returned within transmission range. Once the base station receives the second notification signal, the base station automatically generates a telephone call to every number that was called in response to the first notification signal and plays a prerecorded message indicating that the pet is no longer lost.

The telephone numbers and associated messages may be entered into the memory contained in the base station through an ordinary telephone. The telephone connects to the base station through a standard phone jack (e.g., a RJ-11 phone jack). The owner typically presses a button on the base station to place it in a "record" mode, activates the telephone (i.e., goes "off hook"), and then enters the telephone number using the keypad on the telephone. When the telephone number is complete, the owner again presses the button and then records a message associated with the phone number by speaking into the telephone or using the keypad on the telephone. The owner may then repeat this process for another telephone number or deactivate the telephone (i.e., goes "on hook") to end the recording session. Several different telephone numbers and associated messages may be recorded in this manner. Alternatively, the base station may include a keypad and a microphone that may be used for programming. This configuration may be less expensive to implement and more convenient to use. This is particularly true for very small telephones that may be awkward to access while held within the base unit.

The base station, which contains a cradle to hold the portable unit, has two contacts that correspond to two contacts on the portable unit. When the portable unit rests in the cradle, the base station charges a battery contained within the portable unit through these contacts. The cradle also contains a communications port that corresponds to a communications port on the portable unit such that when the portable unit is placed within the cradle, the two communications ports become operatively connected. When the portable unit detects that the pet has wandered out of range, a notification signal is transmitted from the portable unit to the base station through the communications connection. Upon receiving the notification signal, the base station automatically calls one or more telephone numbers and plays the associated messages to alert the owner that the pet is lost.

When the owner takes the pet away from home, for example on a walk, the portable unit may be removed from the base station and carried along. In this away-from-home mode, the base station may not automatically place telephone calls when the portable unit enters an alarm condition. Nevertheless, those skilled in the art will appreciate that a wireless communications link between the portable unit and the base station could allow the base station to operate even when the portable unit is not located in the base station. For example, this wireless communications link could be a radio frequency transmission, a paging signal, or another suitable type of wireless communication.

The basic pet notification system described above may also be augmented with one or more advanced, and more expensive, options. One such advanced option is a paging receiver located in the pet collar. Electrically, this paging receiver may be a very similar to the pagers presently worn by many people. Upon receiving notice that his or her pet is lost, the pet owner transmits a paging signal to the collar, typically by placing a telephone call to a directory number associated with the paging unit located in the collar. The paging signal may include a telephone number where the owner can be reached. The display device on the collar displays the number along with an appropriate message, such as "LOST PET, PLEASE CALL (XXX) XXX-XXXX."

The paging receiver allows the pet owner to determine which telephone number is displayed on the collar, which may be useful if the pet becomes lost while away from home, for instance on vacation. The paging receiver may also allow the owner to specify the message displayed on the collar. In addition, the portable unit may include a wireless telephone, in which case the display device may display the telephone number assigned to the portable unit. In this case, the telephone number of the portable unit may be the default telephone number displayed on the collar unless the owner transmits a paging signal to the collar to change the displayed telephone number. In addition, the portable unit may be a general-purpose wireless telephone to which the lost pet alarm function has been added. Alternatively, the portable unit may be a special-purpose wireless telephone that activates only when the portable unit enters an alarm condition.

In addition, to minimize the number of telephone numbers permanently occupied by lost pet notification systems, the telephone company may assign a temporary telephone number to the portable unit when the portable unit enters an alarm condition and registers for telephone or paging service. Once the alarm condition has ended, the temporary telephone number can be released for use by other wireless devices (e.g., other lost pet notification systems). In this case, the portable unit may contemporaneously transmit its temporary telephone number to the pet collar, which will display the temporary telephone number. Further, if the pet collar includes a wireless telephone or bidirectional paging unit, the telephone company may assign a temporary telephone number to the pet collar when the collar enters an alarm condition and registers for telephone or paging service. To enable this option, the telephone company may transmit both temporary telephone numbers (i.e., a first for the pet collar and a second for the portable unit) to the portable unit and/or to the pet collar so that the pet owner and/or the pet collar will be able to use both while the pet owner searches for the lost pet.

As another advanced option, the pet collar may contain a global positioning device (e.g., a Global Positioning Satellite receiver) and a bi-directional paging unit. The owner activates the global positioning device by sending a paging signal to the paging unit in the pet collar. Once activated, the global positioning device receives location signals from global positioning transmitters, typically satellites. The global positioning device triangulates this information to determine the coordinates where the pet collar is located, and the bi-directional paging unit periodically transmits the coordinates and a unique pet identification number to the pet owner or to a tracking station.

Alternatively, the global positioning device may simply retransmit the signals received from the global positioning transmitters, and the tracking station may perform the triangulation necessary to determine the coordinates for the pet collar location. This may reduce the size, weight, and cost of the collar somewhat. To conserve battery power within the collar, the global positioning equipment is not activated until the owner transmits an initial paging signal to the collar. The pet owner can also turn off the global positioning equipment by transmitting a subsequent paging signal to the pet collar. In addition, the collar may be configured to adjust the strength and frequency of transmissions from the collar in response to paging signals transmitted to the collar. This will allow the owner to strategically control the use of the battery power in the collar.

The tracking station may be a central facility serving a large number of pet owners. In this case, the tracking station may periodically notify a pet owner of a lost pet's location, for example over the telephone, through e-mail, or by posting the information on an Internet server. In this case, a map showing the location of the pet may be transmitted to the pet owner or posted on the Internet server. In addition, a live operator may provide assistance over the telephone or a computer link to assist a pet owner in tracking his or her lost pet. If the computer is portable, the pet owner will be able continually receive location information from the tracking station while driving or walking around. Alternatively, a pet owner's personal computer may serve as the tracking station, in which case the computer may receive paging transmissions directly from the pet collar or through a wireless telephone or paging unit that plugs into a modem in the pet owner's computer. In this case, the portable unit may operate as this wireless telephone or paging unit.

As another advanced option, the lost pet notification system may contain a beacon transmitter that emits a homing signal. Once the owner is ready to physically track the pet, he or she transmits a paging signal to the pet collar to activate the beacon transmitter. The beacon signal is received by a strength-of-signal direction finder located in the portable unit. The direction finder includes a directional antenna for receiving the beacon signal and a display for indicating the strength and direction of the homing signal. Again to conserve battery power within the collar, the homing function is not activated until the owner transmits an initial paging signal.

As an alternative to the global positioning device and the beacon transmitter, the paging unit may periodically transmit a signal on the overhead data channel of the cellular network. For example, the paging unit may emulate a registering cellular telephone by periodically transmitting an autonomous registration message. These registration signals may be detected by a plurality of cellular receivers, which will allow the cellular system to determine the approximate position of the pet collar. The cellular system then forwards this location information to the pet owner, who tracks the pet. In addition, the directional strength-of-signal receiver may use the periodic autonomous registration messages transmitted by the paging device as the homing signal. In this context, "cellular" refers generally any type of cellular wireless communication system, including both the original analog cellular system deployed in the United States, as well as digital protocols, including TDMA, CDMA and other digital cellular technologies, including the cellular systems described in the Global System Communication (GSM) Mobile Application Part (MAP) and the EIA/TIA Interim Standard 41 (IS-41 standard).

At present, global positioning receivers and bi-directional paging devices, along with suitable batteries, are too large to be carried on pet collars for small animals, such as cats and small dogs. As technology advances and computer components and batteries become smaller and less expensive, however, it is anticipated that the advanced options described above will become more attractive to customers. In addition, the Federal Communications Commission has mandated that wireless telephones be generally locatable by the year 2000. Although the technologies that will be deployed in response to this mandate cannot be known at this time, it should be understood that the present invention may be modified to perform positioning using whatever technology may be implemented to satisfy the mandate. Therefore, the pet notification system described above may be initially deployed with only the basic features. Replacement pet collars and portable units with increased functionality may then be introduced as the size and cost of the components that implement these functions come down, and the demand for these functions increase.

Turning now to the figures, in which like numerals refer to like elements in the several figures, exemplary embodiments of the invention are described with reference to these figures. It should be understood that following description pertains to the particular embodiment shown in the figures, and the many variations of this embodiment will be evident in view of the preceding discussion.

FIG. 1. is an illustration of the basic features of the lost pet notification 100 system. The major components of the lost pet notification system are a pet collar 102, a portable unit 112, and a base station 120. The collar contains a housing that holds an alarm device including a speaker 103 that produces a loud chirping sound and one or more lights 106 around the outside of the collar. The collar also includes an ON/OFF switch 105 and a PRESS TO TEST switch 107, which allow the owner to turn off and test the alarm.

The portable unit 112 is a handheld device that emits a continual polling signal over a communications link 108 to the pet collar 102. For example, the portable unit may emit a polling signal every 15 seconds. Each time the pet collar 102 receives a polling signal, it responds by transmitting a reply signal back to the portable unit 112. This mode of handshaking continues while the pet collar 102 remains within the transmission range 150 of the portable unit 112. Should the pet travel outside the transmission range 150, the pet collar 102 no longer receives the polling signals. When the pet collar 102 fails to detect a polling signal for a predetermined period of time, such as one minute, the pet collar automatically enters an alarm condition. Similarly, if the portable unit 112 fails to receive a reply signal for a predetermined number of polling signals, such as four, the portable unit 112 automatically enters an alarm condition.

Upon entering the alarm condition, the pet collar 102 produces a high pitched chirping noise through a speaker 103 and illuminates a series of high intensity LEDs 106 to alert persons nearby the pet is lost. In addition, the pet collar may contain an LCD display device 104 to display messages, such as "LOST PET, PLEASE CALL (XXX) XXX-XXXX." When the portable unit 112 enters an alarm condition, it also emits a high pitched chirping noise through a speaker 116, illuminates one or more lights, and may activate an LCD display device 114 to display a message, such as "ATTENTION, YOUR PET IS LOST," or another suitable message.

In addition to activating its on-board alarms, the portable unit 112 automatically transmits a notification signal to a base station 120. The base station responds to this notification by automatically placing a telephone call through a phone jack 126 over a telephone network 136 to a remote telephone 144. Once the call is answered, the base station 120 plays a prerecorded message to notify the pet owner that the pet has strayed beyond the transmission range 150. The base station 120 may repeats this process a number of stored telephone numbers and associated messages, such as five (although the number of telephone calls placed by the base station could be more or less than five). Any recipient of a notification communication may reply with a predetermined acknowledgement code, such as **9, which will cause the base station to discontinue the notification procedure.

Although the portable unit 112 typically transmits the notification signal to the base station 120 only when the portable unit is located within the base station, the portable unit could use a wireless communication link to transmit the notification signal to the base station when the portable unit is not located within the base station. That is, the portable unit 112 may transmit the notification signal in one of two ways. First, when the portable unit 112 is held within a cradle 130 located on the base station 120, a communications port 115 on the portable unit 112 becomes operatively connected to a communications port 132 on the base station 120. This allows the portable unit 112 to transfer the notification signal to the base station 120 through the communications ports 130 and 132.

Second, when the portable unit 112 is detached from the base station 120, the portable unit 112 may transmit the notification signal through an antenna 118 over a free space communications path 134 that is received by an antenna 122 on the base station 120. Alternatively, the portable unit 112, which may include a wireless telephone or paging unit, may place a telephone call or transmit a paging signal to a paging unit within the base station 120.

When the base station 120 receives the notification signal, it automatically generates at least one telephone call and plays a prerecorded message. The base station 120 is connected to the telephone network through a telephone jack 126. The message is conveyed over the telephone network 136, through a conventional telephone center or switch 138, and to a telephone or paging unit 144. The telephone number and associated message is chosen from a plurality of telephone numbers and associated messages previously stored in the base station. The owner enters these telephone numbers and associated messages through a conventional telephone connected to a telephone jack 128 located on the base station 130.

Figure 2:
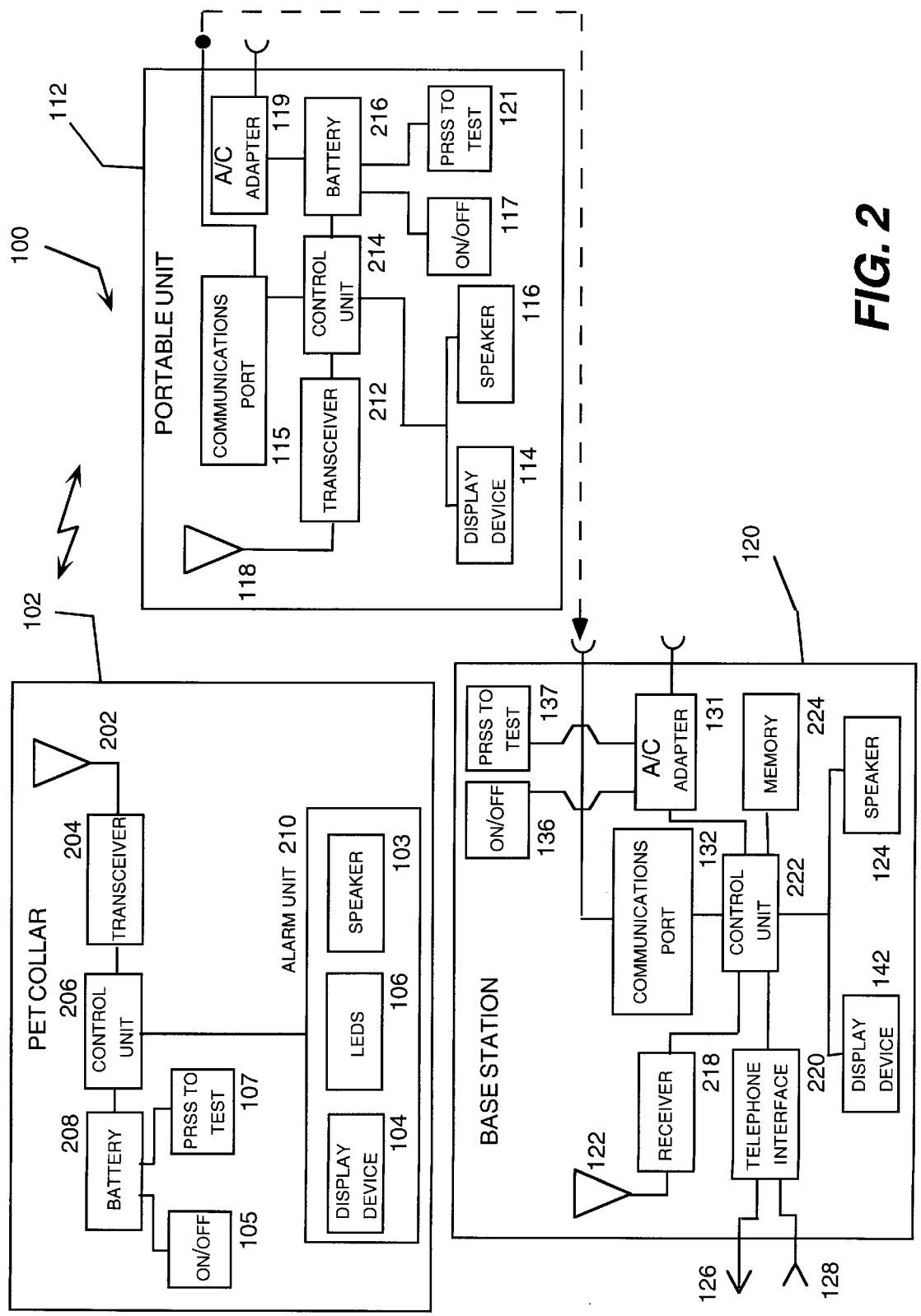
FIG. 2 is a functional block diagram detailing the relationship between the pet collar, the portable unit, and the base station.

FIG. 2 is a functional block diagram illustrating the pet collar 102, the portable unit 112, and the base station 120. A control unit 214 within the portable unit 112 generates a periodic timing signal that drives the transceiver 212, which generates the polling signals. Each polling signal is then transmitted to the pet collar 102 through a bi-directional antenna 118. The control unit 214 is powered either through an internal battery 216 or through an A/C adapter 119. The internal battery 216 is charged when the portable unit 112 is located within the cradle 130 of the base station 120, and powers the portable unit when it is removed from the cradle.

More specifically, when the portable unit 112 is resting in the cradle 130 of the base station 120, the A/C adapter 119, which includes a pair of touch-pin connectors, makes contact with the portable unit adapter 131 located in the cradle 130 of the base station 120. This allows the an external source to charge the battery and supply power to the electrical components of portable unit when portable unit is resting in the cradle 130.

The pet collar 102 receives the polling signal from the portable unit 112 through a bi-directional antenna 202. The polling signal is detected by a transceiver 204 and converted into a signal that is representative of the strength of the polling signal. The control unit 206 continually monitors the transceiver 204 to determine whether the strength of the converted signal is above a predetermined threshold. If the signal strength is above the threshold limit, the control unit 206 activates the transceiver 204 to transmit a reply signal back to the portable unit 112 through the bi-directional antenna 202. If the control unit 206 determines that a polling signal above the threshold limit has not been detected for a predetermined number of cycles, the control unit 206 enters an alarm condition and activates the alarm unit 210. A battery 208 contained within the pet collar powers the antenna 202, the control unit 206, the transceiver 204, and the elements connected to the alarm unit 210.

The reply signal transmitted by the pet collar 102 is received by the bi-directional antenna 118 of the portable unit 112 and detected by the transceiver 212. The control unit 214 continually monitors the transceiver to whether determine the portable unit 112 receives reply signals. If the portable unit 112 fails to receive a reply signal to a predetermined number of polling signals, the portable unit 112 enters an alarm condition.

In response to detecting an alarm condition, the portable unit 112 automatically transmits a notification signal to the base station 120, as described previously. The notification signal is received a receiver 218, which passes the notification signal to the control unit 222 of the base station 120. The control unit 222 then retrieves from memory 224 at least one telephone number and a message associated with the stored telephone number. The control unit 222 then initiates a telephone call through a telephone interface 220 connected to a telephone jack 216. Upon receiving notification that the telephone call has been answered, the control unit 222 plays the associated message.

Figure 3:
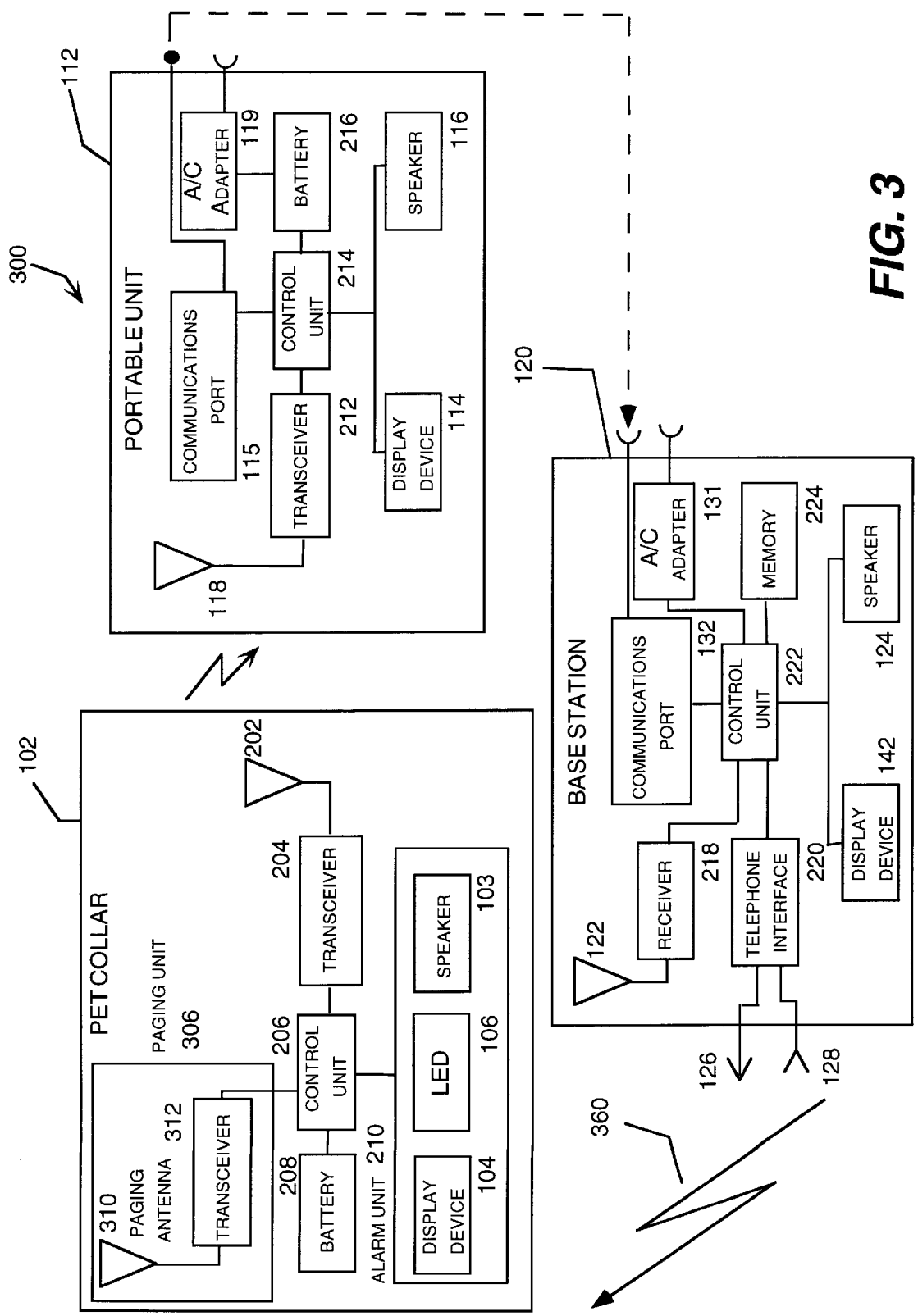
FIG. 3 is a functional block diagram illustrating a lost pet notification system including paging receiver.

FIG. 3 illustrates an advanced feature of the invention that uses a paging receiver 306 located on the pet collar 102. This paging receiver allows the pet owner to transmit paging signals to the pet collar to control the operation of the collar. That is, the paging receiver 306 has an associated telephone number, which the pet owner may dial from any conventional telephone or paging transmitter to transmit a message to the pet collar. Alternatively, the portable unit 112 may include a wireless telephone or paging device, in which case the owner may transmit the paging signal from the portable unit. For example, the portable unit may operate as this telephone or paging transmitter.

The pet collar 102 may respond to a menu of predefined paging messages transmitted to the paging receiver 306. This menu may be printed on a label affixed to the back of the portable unit, particularly if the portable unit includes a wireless telephone or paging unit. For example, the code **\*\*1 may turn the alarm on or off, and the code \*\*2** may precede a series of numbers (e.g., DTMF telephone signals) to be displayed on the collar.

The paging receiver 306 allows the pet collar 102 to display information received in a paging signal. Specifically, the pet owner may specify a message to be displayed on the collar and/or a telephone number to be displayed as part of the message (e.g., "LOST PET, PLEASE CALL (XXX) XXX-XXXX"). This may be beneficial if the pet is lost when traveling on vacation, or if a friend or relative is available at a particular location to receive telephone calls regarding the lost pet. Alternatively, the owner may specify the telephone number of a friend's wireless telephone, which the owner has borrowed and will be carrying while searching for the pet.

The paging receiver 306 may also allow the owner to activate and deactivate the alarm on the pet collar remotely. This allows the pet owner to turn off the alarm to save the battery, if desired. The ability to strategically control use of the battery in pet collar may by advantageous because the battery can be expected to last several months, but will be expended more quickly when the collar enters an alarm condition. The owner may also override the ON/OFF switch and turn on the alarm, if desired. This feature might be helpful if someone turned the collar off before the pet became lost, in which case paging signals will be required to activate and deactivate the alarm.

Figure 4:
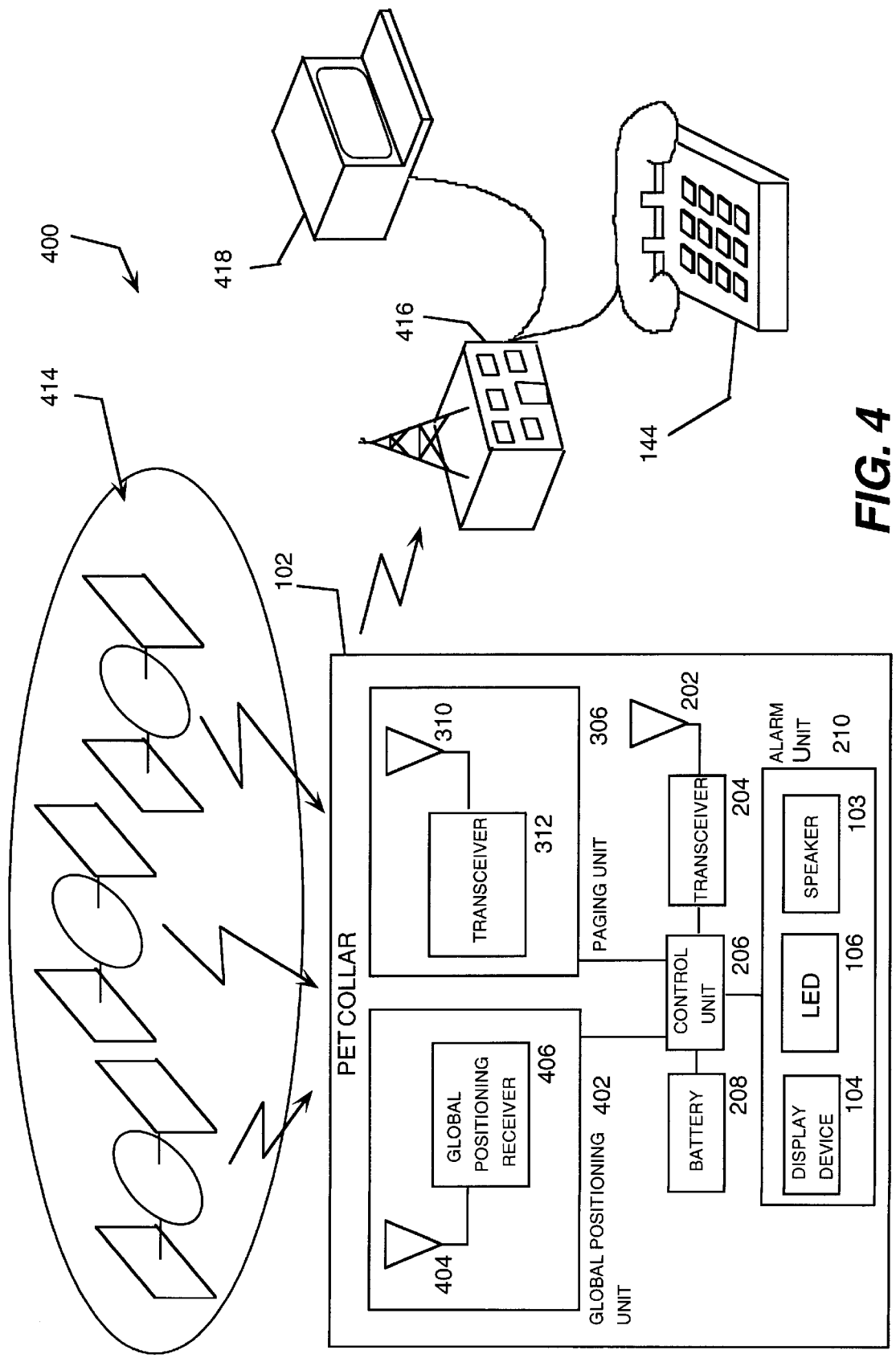
FIG. 4 is a functional block diagram illustrating a lost pet notification system including a global positioning receiver and a bi-directional paging unit.

FIG. 4 illustrates another advanced feature of the invention, which includes a global positioning (GPS) unit 402. The GPS unit 402 includes a GPS receiver 406, a GPS antenna 404, and a bi-directional paging unit 306 located in the pet collar 102. Note that the paging unit 306 is bidirectional for this advanced feature, whereas a receive-only paging unit was adequate for the previous feature. The bi-directional paging unit 306 allows the pet collar to both receive and transmit signals over a paging network.

The GPS unit 402 can be activated and deactivated by transmitting paging signals to the pet collar. For example, the code 3 may activate the GPS unit 402, and the code 4 may deactivate the GPS unit. The signal is received through a paging antenna 310 and processed in the paging unit transceiver 312. The signal is passed to the control unit 206, which generates a signal to activate the global positioning receiver 406. The global positioning receiver 406 continually receives location signals from GPS satellites 414 through the GPS antenna 404, and the control unit 206 uses this information to determine the coordinates where the pet collar is located. These coordinates and a unique pet identification number are then passed to the paging unit 306, which transmits the information to a monitoring center 416, which passes more useful location information, such as a map showing the location of the lost pet, to the pet owner. Alternatively, the owner may retrieve the coordinate data directly from the pet collar 102, or by dialing into the monitoring center 416 using a standard telephone 144 and inputting the pet identification number. The monitoring center 416 will then retrieve the coordinate data corresponding to the pet identification number and provide it to the owner.

The monitoring center 416 may also post the coordinates and/or additional location information, such as a map, on a web page on the Internet. This allows the pet owner to log onto the web page through a personal computer 418, provide the pet identification number, and view the location of their pet displayed on a map image on the computer screen 420. To minimize the size and cost of the pet collar 102, the collar may simply pass the GPS location signals to the monitoring center 416, which performs the triangulation computations to determine the coordinates where the pet is located. In addition, the monitoring center 416 may be the pet owner's personal computer, in which case the triangulation and mapping functions reside in a software module provided with the pet location system. Further, the portable unit 112 may operate as a wireless telephone or paging device to integrate the telephone or paging system with the pet owner's portable personal computer. If the pet owner's personal computer 418 is portable, the pet owner will be able to continually receive updates on the pet's location while driving or walking around searching for their pet.

Figure 5:
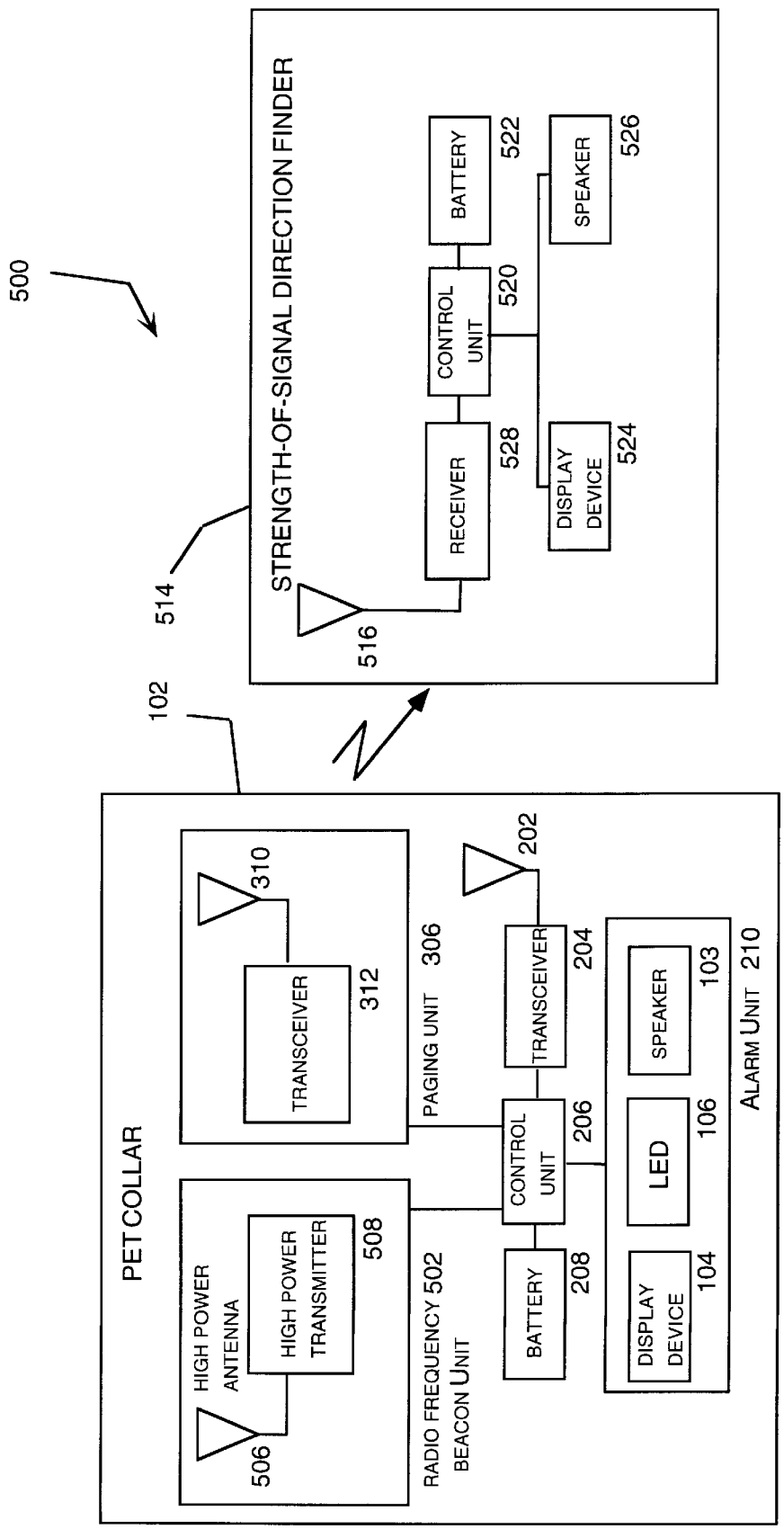
FIG. 5 is a functional block diagram illustrating a lost pet notification system including a beacon transmitter and a paging receiver.

FIG. 5 illustrates another advanced feature of the invention that includes a radio frequency beacon 502 and a paging unit 308 located in the pet collar 102. The beacon 502, which transmits a homing signal, can be activated and deactivated by transmitting paging signals to the pet collar 102. For example, the code 5 may activate the beacon 502, and the code 6 may deactivate the beacon. The homing signal is triggered by the control unit 206, which generates a signal to activate a radio frequency transmitter 508 located in the beacon unit 502. The transmitter 506 generates the homing signal and transmits it through an antenna 506.

The homing signal may be received by a directional strength-of-signal received 514 in the portable unit 112. The homing signal is received by the antenna 516 and detected by the receiver 528. The homing signal is then passed to a control unit 520, which calculates the approximate direction and distance to the pet collar 102. The portable unit 112 displays information representative of the direction and the strength of the homing signal on a display device 524, which may be the same as the display device 114. The portable unit 112 may also include a speaker 526 to produce a periodic sound having a volume that is representative of the strength of the homing signal. Again, the speaker 526 may be the same as the speaker 116.

Figure 6:
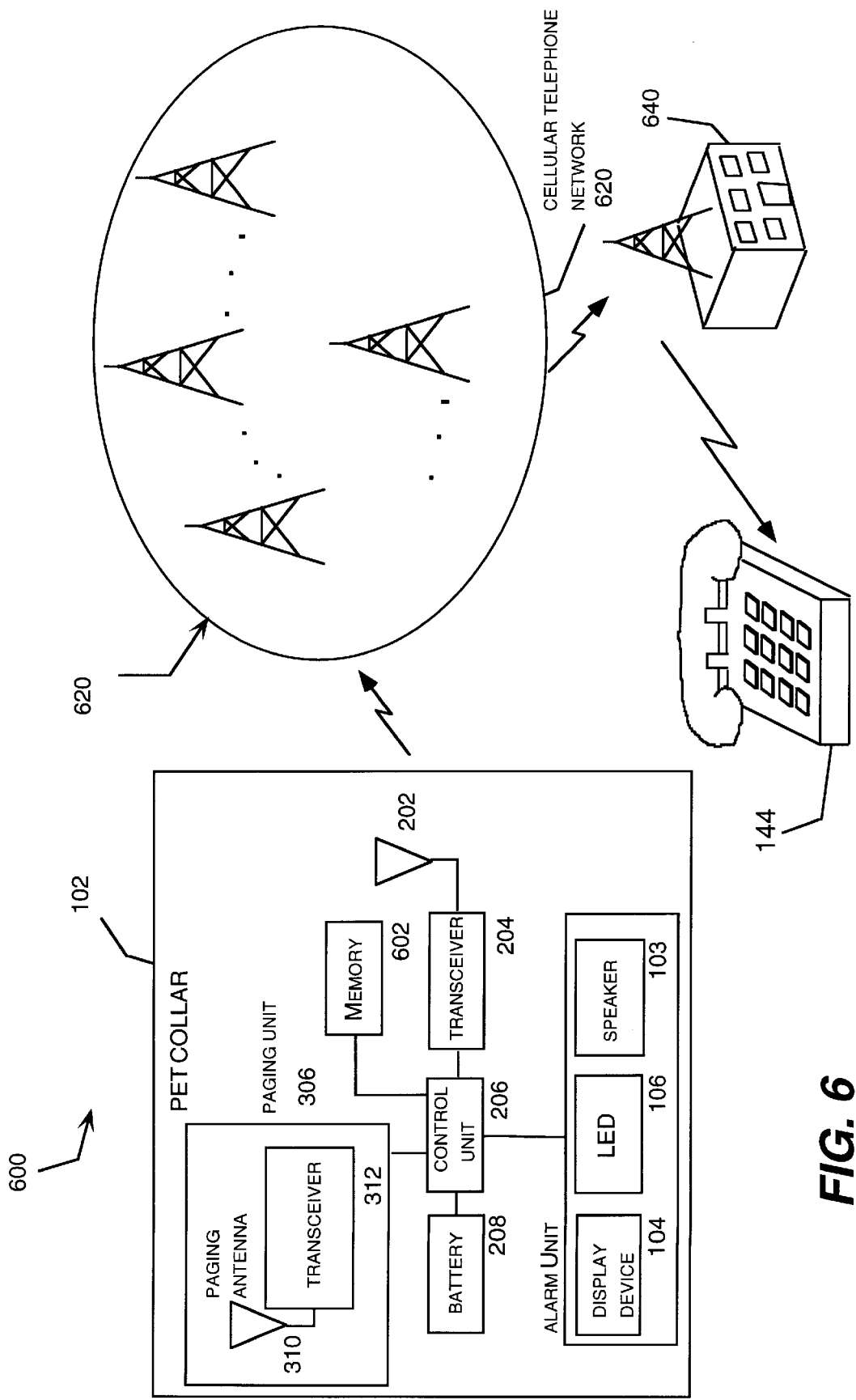
FIG. 6 is a functional block diagram illustrating a lost pet notification system including a positioning system and a beacon transmitter implemented using the wireless telephone network.

FIG. 6 illustrates another embodiment of the invention, in which the previously described GPS and homing functions are performed through a cellular paging network. Instead of transmitting GPS and homing signals, the paging unit 306 emulates a registering cellular telephone by periodically transmitting autonomous registration messages through the paging antenna 310 on the overhead data channel of the cellular network 620. The autonomous registration messages are received by a plurality of cellular antennas 630 within the cellular network 620. The cellular network 620 processes the autonomous registration messages and determines the location of the pet collar 102. Alternatively, the cellular network 620 may pass the autonomous registration messages to a monitoring center 640, which performs the triangulation computations to determine the approximate location of the pet collar 102. The location of the pet collar is then transmitted to the pet owner, as described previously with reference to FIG. 4. In addition, the autonomous registration messages may be used as the homing signal described previously with reference to FIG. 5.

Figure 7:
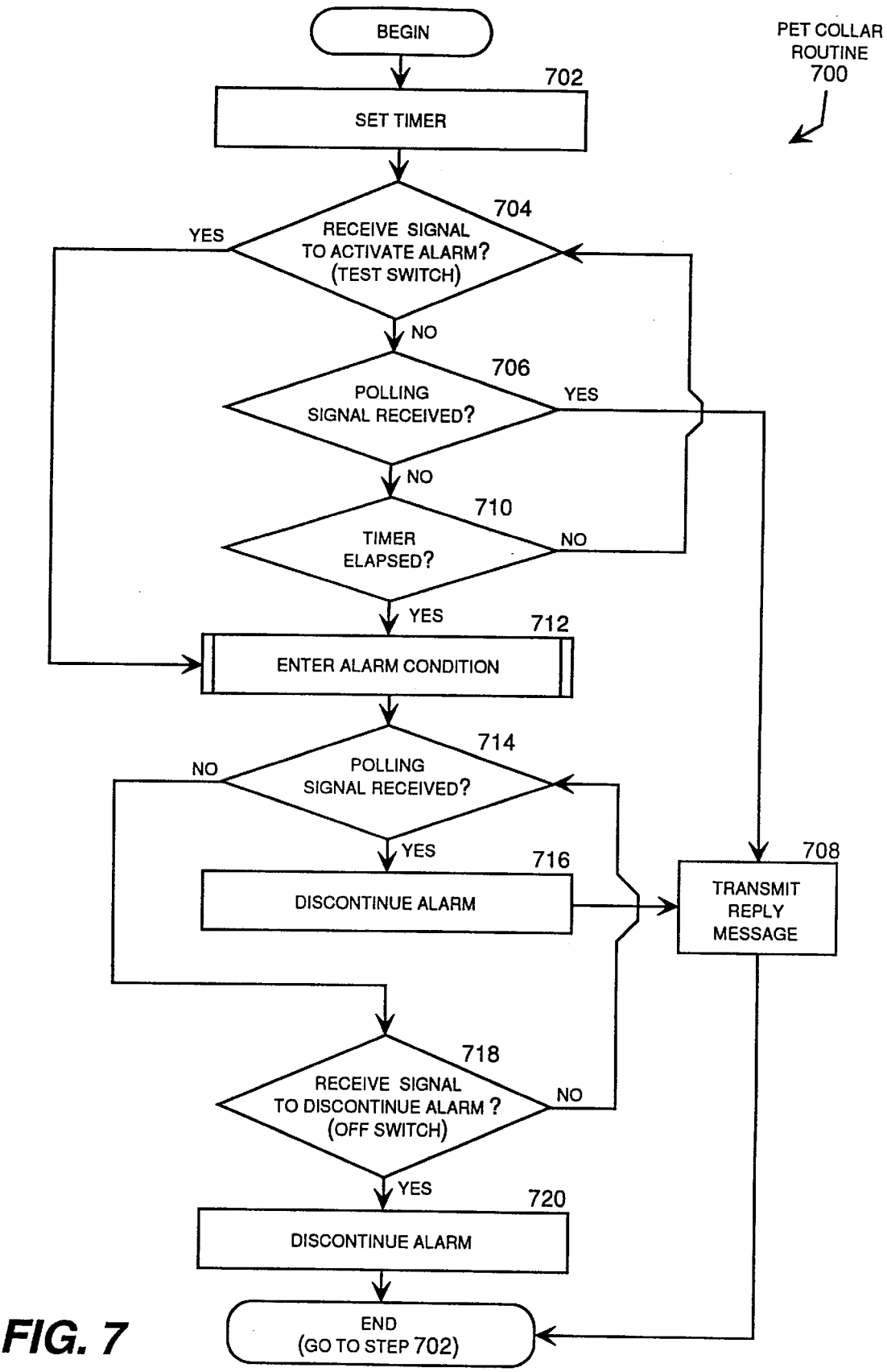
FIG. 7 is a logic flow diagram illustrating the functional routine for the pet collar.

FIG. 7 is a logic flow diagram illustrating the routine 700 for the pet collar 102. In step 702, the pet collar 102 initializes a timer. Step 702 is followed by step 704, in which the pet collar 102 checks to determine whether the test switch has been depressed. If the test switch has been depressed, the "YES" branch is followed to step 712, in which the pet collar 102 enters an alarm condition. Routine 712 is described below with reference to FIG. 8. If the test switch has not been depressed, the "NO" branch is followed to step 706, in which the pet collar 102 determines whether a polling signal was received from the portable unit 112. If the pet collar 102 received a polling signal, the "YES" branch is followed to step 708, in which the pet collar 102 transmits a reply signal back to the portable unit 112. Step 708 is followed by the "END" step, which returns to step 702.

Referring again to step 706, if a polling signal was not received, the "NO" branch is followed to step 710, in which the pet collar 102 determines whether the timer has exceeded a predetermined time limit, such as one minute. If the timer has exceeded the time limit, the "NO" branch loops to step 704. If the timer has exceeded the time limit, the "YES" branch is followed to routine 712, in which the pet collar enters an alarm condition. Routine 712 is followed by step 714, in which the pet collar 102 determines whether a polling signal was received from the portable unit 112. If a polling signal was received from the portable unit 112, the "YES" branch is followed to step 716, in which the pet collar 102 discontinues the alarm condition. Step 716 is followed by step 708, in which the pet collar 102 transmits a reply signal back to the portable unit 112. Step 708 is followed by the "END" step, which returns to step 702.

Referring again to step 714, if the pet collar 102 has not received a polling signal from the portable unit, the "NO" branch is followed to step 718, in which the pet collar 102 determines whether it has been turned off. If the pet collar 102 is not turned off, the "NO" branch loops to step 714, and the alarm remains active. If the pet collar 102 has been turned off, the "YES" branch if followed to step 720, in which the collar discontinues the alarm. Step 720 is followed by the "END step, which returns to step 702.

Figure 8:
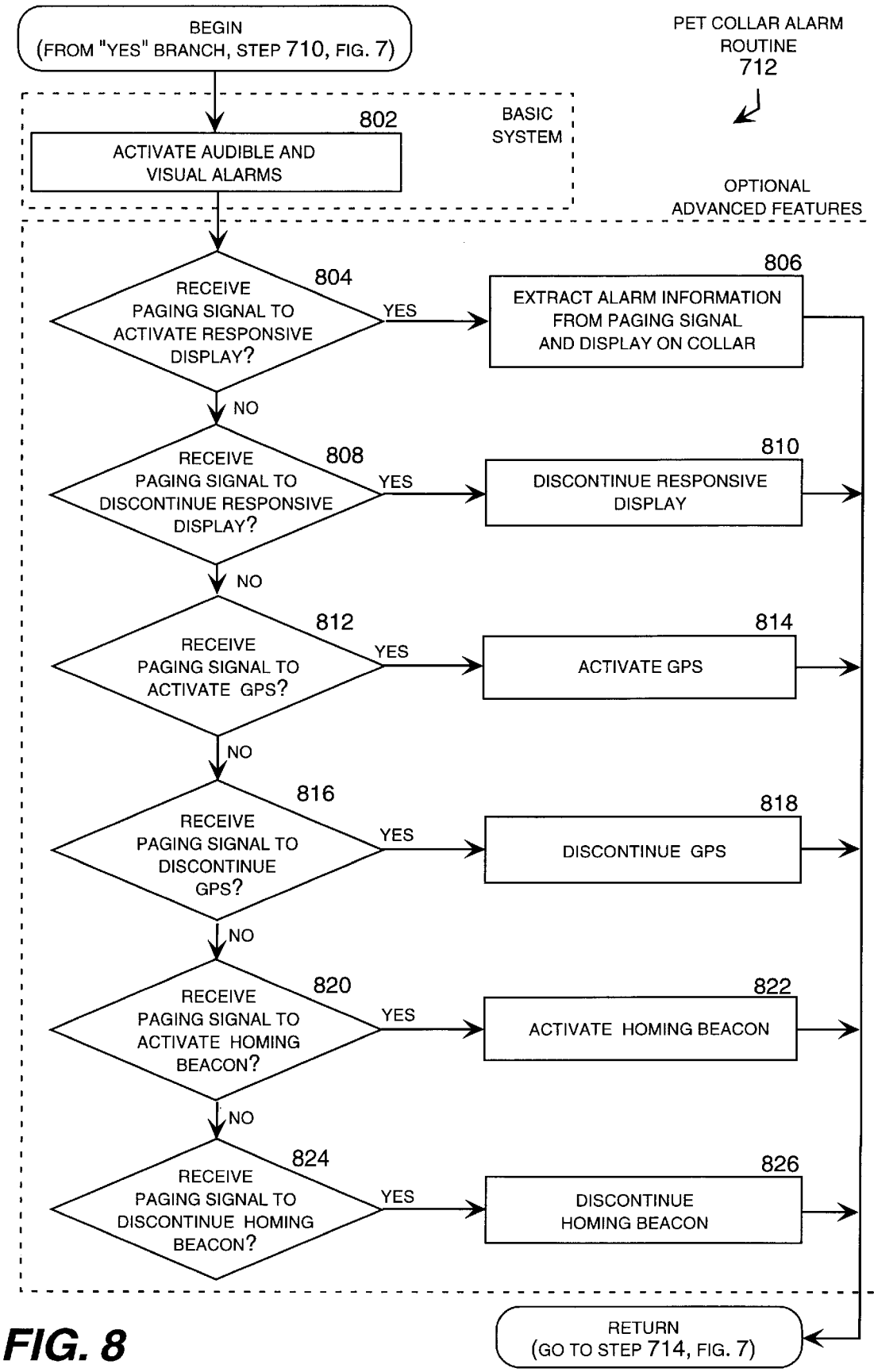
FIG. 8 is a logic flow diagram illustrating the functional routine for the alarm condition on the pet collar.

FIG. 8 is a logic flow diagram that illustrates routine 712, in which the pet collar 102 enters an alarm condition. Routine 712 follows the "YES" branch from step 710, shown of FIG. 7. Within routine 712, step 802 is part of the basic alarm system, whereas steps 804–826 illustrate optional advanced features.

Routine 712 begins at step 802, in which both audible and visual alarms are activated. Step 802 is followed by step 804, in which the pet collar 102 determines whether the paging unit 306 received a paging signal to activate a responsive display. The responsive display device, which is represented by the LCD 104, is configured to display contemporaneously received alarm information. If the paging unit receives a paging signal to activate the responsive display, the "YES" branch is followed to step 806, in which the pet collar 102 extracts the alarm information from the paging signal and displays it on the display device 104. Step 806 is followed by the "RETURN" step, which returns to step 714 in FIG. 7.

Referring again to step 804, if the pet collar 102 did not receive a paging signal to activate the responsive display, the "NO" branch is followed to step 808, in which the pet collar 102 determines whether the paging unit 306 received a paging signal to discontinue displaying a message on the display device 104. If the paging unit 306 received a signal to discontinue the responsive display, the "YES" branch is followed to step 810, in which the display unit 104 is turned off. Alternatively, all of the pet collar alarms may be turned off in step 810. In this case, a subsequent message may reactivate the alarms. A similar message may also activate the pet collar alarms even when the on/off switch is in the off position. Step 810 is followed by the "RETURN" step, which returns to step 714 in FIG. 7.

Referring again to step 808, if the pet collar 102 did not receive a paging signal to discontinue the responsive display, the "NO" branch is followed to step 812, in which the pet collar 102 determines whether the paging unit 306 received a paging signal to activate the GPS unit 402. If the paging unit 306 received a signal to activate the GPS unit 402, the "YES" branch is followed to step 814, in which the pet collar activates the GPS unit. Step 814 is followed by the "RETURN" step, which returns to step 714.

Referring again to step 812, if the pet collar 102 did not receive a paging signal to activate the GPS unit 402, the "NO" branch is followed to step 816, in which the pet collar 102 determines whether the paging unit 306 received a paging signal to deactivate the GPS unit. If the paging unit 306 received a signal to deactivate the GPS unit 402, the "YES" branch is followed to step 818, in which the pet collar deactivates the GPS unit. Step 818 is followed by the "RETURN" step, which returns to step 714.

Referring again to step 816, if the pet collar 102 did not receive a paging signal to deactivate the GPS unit 402, the "NO" branch is followed to step 820, in which the pet collar 102 determines whether the paging unit 306 received a paging signal to activate the beacon unit 502. If the paging unit 306 received a signal to activate the beacon unit 502, the "YES" branch is followed to step 822, in which the pet collar activates the beacon unit 502. Step 822 is followed by the "RETURN" step, which returns to step 714.

Referring again to step 820, if the pet collar 102 did not receive a paging signal to activate the beacon unit 502, the "NO" branch is followed to step 824, in which the pet collar 102 determines whether the paging unit 306 received a paging signal to deactivate the beacon unit 502. If the paging unit 306 received a signal to deactivate the beacon unit 502, the "YES" branch is followed to step 826, in which the pet collar deactivates the beacon unit 502. Step 822 is followed by the "RETURN" step, which returns to step 714.

Figure 9:
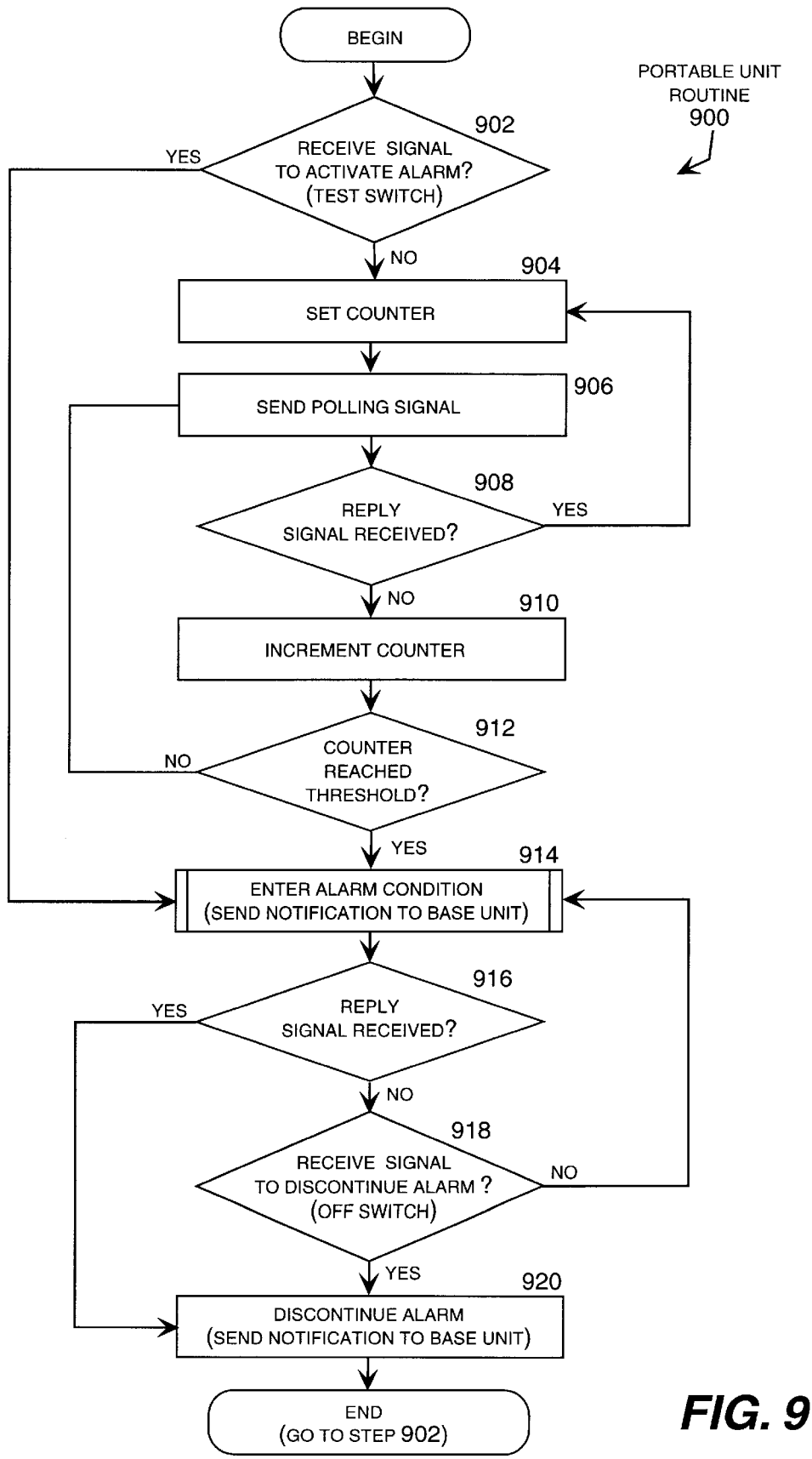
FIG. 9 is a logic flow diagram illustrating the functional routine for the portable unit.

FIG. 9 is a logic flow diagram illustrating routine 900 for the portable unit 112. Routine 900 begins at step 902, in which the portable unit 112 determines whether a signal was received to activate the alarm, typically caused by depressing the test switch. If an alarm activation signal was received, the "YES" branch is followed to routine 914, in which the portable unit 112 enters an alarm condition. Routine 914 is described below with reference to FIG. 10.

If an alarm activation signal was not received, the "NO" branch is followed from step 902 to step 904, in which the counter is set to zero. This counter keeps track of the number of polling signals that the portable unit 112 cycles through before a reply signal is received from the pet collar 102. Step 904 is followed by step 906, in which the portable unit 112 sends a polling signal to the pet collar 102. Step 906 is followed by step 908, in which the portable unit 112 determines whether a reply signal was received from the pet collar 102. If a reply signal was received, the "YES" branch loops to step 904, in which the portable unit 112 resets the counter.

If the portable unit does not receive a reply signal in response to transmitting a polling signal, the "NO" branch is followed from step 908 to step 910, in when the portable unit 112 increments the counter by one. Step 910 is followed by step 912, in which the portable unit 112 determines whether the counter has reach a threshold value. If the counter has not reached the threshold value, the "NO" branch loops to step 906, in which the portable unit 112 transmits another polling signal.

If the threshold number of polling signals has been reached, the "YES" branch is followed from step 912 to step 914, in which the portable unit 112 enters into an alarm condition. Step 914 is followed by step 916, in which the portable unit 112 determines whether a reply signal was received from the pet collar 102. If a reply signal was received, the "YES" branch jumps to step 920, in which the alarm condition is discontinued. Step 920 is followed by the "END step, which returns to step 902.

If the portable unit 112 does not receive a reply signal from the pet collar 102, the "NO" branch is followed from step 916 to step 918, in which the portable unit 112 determines whether it has been turned off. If the portable unit 112 is not turned off, the "NO" branch loops to step 914, and the alarm remains active. If the portable unit 112 has been turned off, the "YES" branch if followed to step 920, in which the alarm is discontinued. Step 920 is followed by the "END step, which returns to step 902.

Figure 10:
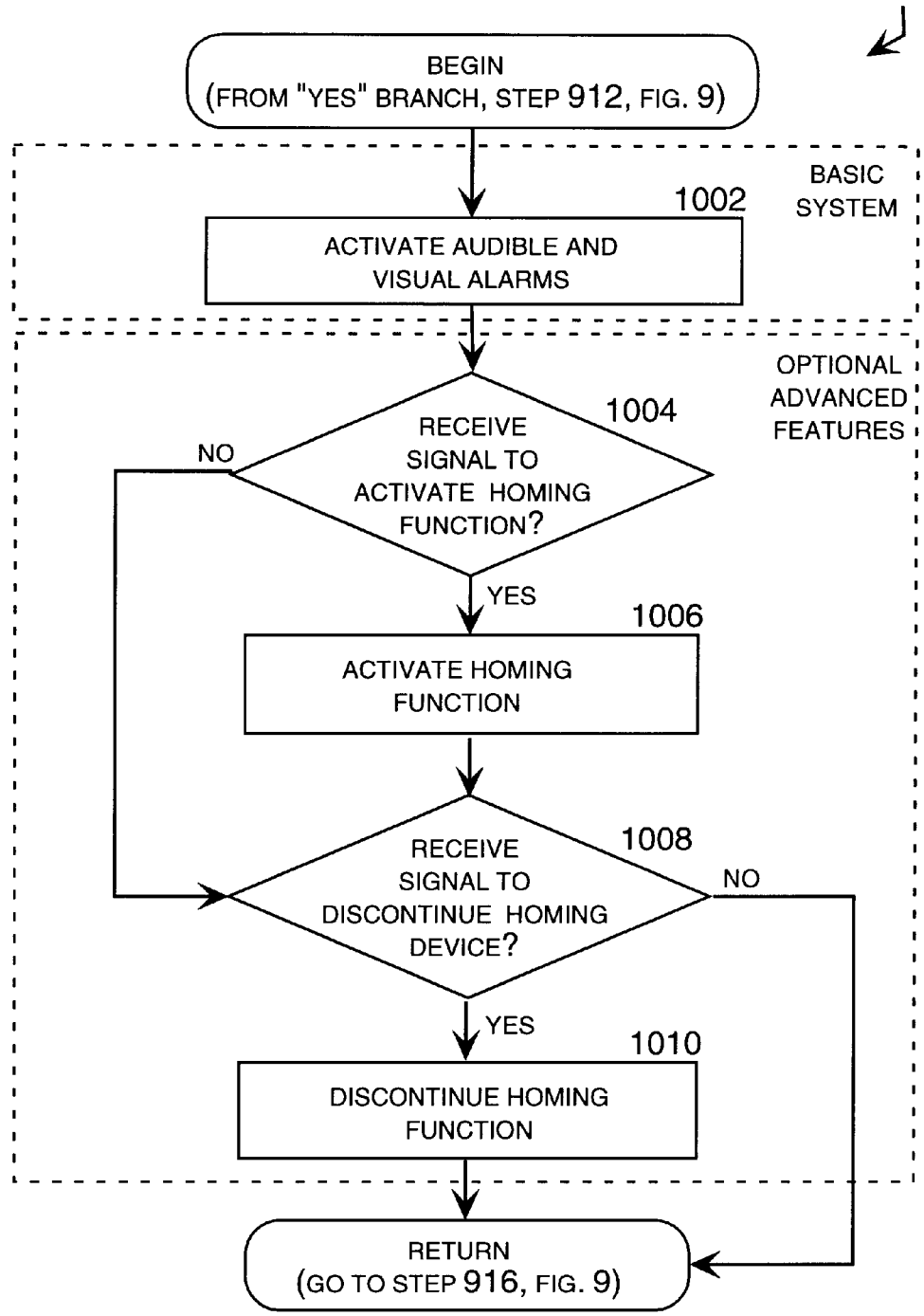
FIG. 10 is a logic flow diagram illustrating the functional routine for the alarm condition on the portable unit.

FIG. 10 is a logic flow diagram that illustrates routine 914, in which the portable unit 112 enters into an alarm condition. Routine 914 follows the "YES" branch from step 912, shown of FIG. 9. Within routine 914, step 1002 is part of the basic alarm system, whereas steps 1004–1010 illustrate optional advanced features.

Routine 914 begins at step 1002, in which the portable unit 112 activates audible and visual alarms. Step 1002 is followed by step 1004, in which the portable unit 112 determines whether it has received a signal to activate a homing function, typically indicated by pressing a button on the portable unit. If the paging unit receives a homing activation signal, the "YES" branch is followed to step 1006, in which the portable unit 112 activates the homing function. The homing function includes receiving a homing signal from the pet collar 102 and displaying or playing information representative of the strength and direction of the homing signal on the portable unit.

If the portable unit does not receive a signal to activate the homing function, the "NO" branch loops from step 1004 to step 1008, in which the portable unit 112 checks whether it received a signal to discontinue the homing function. If the portable unit 112 received a signal to discontinue the homing function, the "YES" branch to is followed to step 1010, in which the portable unit 112 discontinues the homing function. Step 1010 is followed by the "RETURN" step, which returns to step 916 in FIG. 9. If the portable unit 112 did not received a signal to discontinue, the "NO" branch to is followed to the "RETURN" step.

Figure 11:
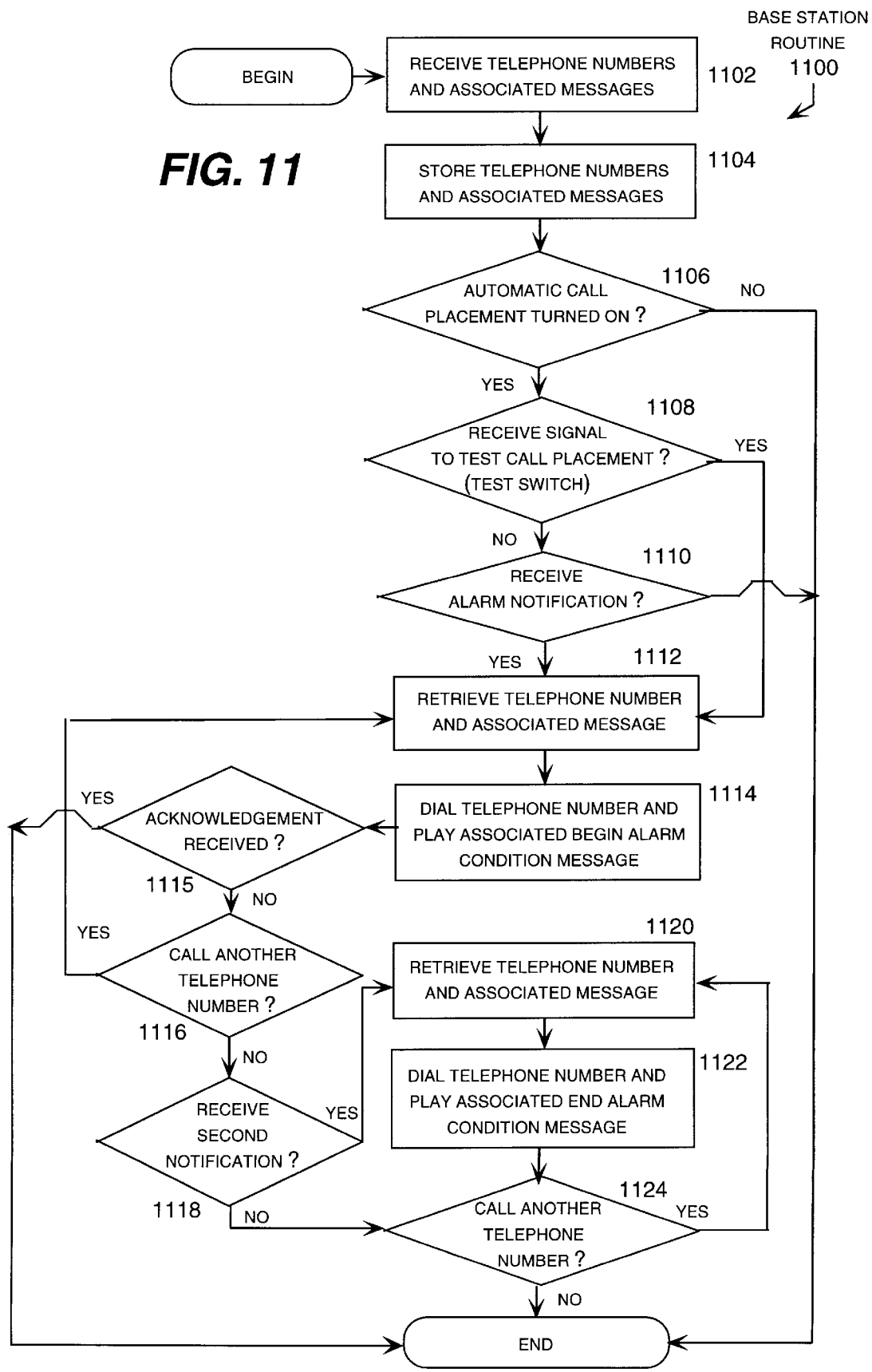
FIG. 11 is a logic flow diagram illustrating the functional routine for the base unit.

FIG. 11 is a logic flow diagram illustrating routine 1100 for the base station. Routine 1100 begins at step 1102, in which the base station 120 receives telephone numbers and a message associated with each telephone number. The telephone numbers and associated messages are input into the base station 120 via a standard telephone 144 connected to the base station 120 through a standard telephone jack (i.e., an RJ-11 jack).

Step 1102 is followed by step 1104, in which the base station 120 stores the telephone number and associated messages in a memory 224. Step 1104 is followed by step 1106, in which the base station 120 checks to determine whether automatic call placement is turned on. For example, automatic call placement may be turned off manually by manipulating a switch, or it may be turned off automatically. Specifically, if the pet cycles into and out of transmission range a predetermined number of times and/or within a predetermined time period, the base station may discontinue notification communications to avoid annoying recipients with multiple notifications, for example if the pet has learned to easily exit and reenter the transmission range (e.g., jump a fence). If the automatic call placement is not turned on, the "NO" branch loops to the "END" step, which returns to step 1102. If the switch is turned on, the "YES" branch proceeds to step 1108, in which the base station 120 determines whether the test switch was depressed. If the base station 120 determines that the test switch was not depressed, the "NO" branch is followed to step 1110, in which the base station 120 determines whether it base station 120 received a notification signal.

If the base station 120 determines the test switch was depressed, the "YES" branch if followed from step 1008 to step 1112. In addition, if the base station determines that a notification signal was received, the "YES" branch if followed from step 1010 to step 1112, in which the base station 120 retrieves a telephone number and its associated message. Step 1112 is followed by step 1114, in which the base station 120 dials the retrieved telephone number. In response to the phone call being answered at the receiving end, the base station 120 plays the associated message to alert the answering party (or pager) of the alarm condition.

Step 1114 is followed by step 1115, in which the base station 120 determines whether it has received an acknowledgement from a recipient of a notification telephone call. If the base station 120 has received an acknowledgement from a recipient of a notification telephone call, the "YES" branch is followed to the "END" step, which returns to step 1102. If the base station 120 has not received an acknowledgement from a recipient of a notification telephone call, the "NO" branch is followed to step 1116, in which the base station 120 determines whether to place another telephone call to another number. If the base station 120 determines to place another call, the "YES" branch loops to step 1112, and the base station places another telephone call. If there are no more telephone calls to place, the "NO" branch proceeds to step 1118, in which the base station 120 determines whether a second notification signal was received from the portable unit 112. If a second notification signal was received, the "YES" branch is followed to step 1120, in which the base unit 120 retrieves a telephone number and an associated message indicating that the pet has returned within transmission range 150 of the portable unit 112.

Step 1120 is followed by step 1122, in which the base station 120 dials the retrieved telephone number. In response to the telephone call being answered, the base station plays the associated message indicating that the pet is no longer lost. Step 1122 is followed by step 1124, in which base station 120 determines whether to call another number and play its associated message. The decision allows the base station 120 to cancel the alarm notification for all of the telephone numbers that were notified of the alarm condition. As there is not need to cancel a notification that was never received, the base station 120 may place telephone calls to only those telephone numbers corresponding to answered notification telephone calls that were answered. If the base station 120 completed notification telephone calls to more than one telephone number, the "YES" branch loops to step 1120, in which another telephone number and its associated message are retrieved from memory. If there are no more telephone calls to place, the "NO" branch is followed from step 1124 to the "END" step.

The present invention thus provides a pet monitoring and notification system including a pet collar, a portable unit, and a base station that is useful when the owner leaves the pet unattended, and is also useful when the owner takes the pet to a public place, such as to the park on a walk. It should be understood that the foregoing pertains only to the preferred embodiments of the present invention, and that numerous changes may be made to the embodiments described herein without departing from the spirit and scope of the invention.

What is claimed is:

1. A lost pet notification system, comprising:

a pet collar operative for receiving a polling signal, responding to the polling signal by transmitting a reply signal, detecting a first alarm condition, and activating the first alarm in response to the first alarm condition;

a portable unit operative for transmitting the polling signal to the pet collar when the pet collar is within transmission range of the portable unit, receiving the reply signal from the pet collar when the portable unit is in receiving range of the pet collar, detecting a second alarm condition, and activating a second alarm in response to the second alarm condition; and a base station configured for removeably holding the portable unit, receiving a notification of the second alarm from the portable unit, and automatically placing at least one notification communication using a predetermined recipient identifier in response to the second alarm condition.

2. The lost pet notification system of claim 1, wherein:
the pet collar detects the first alarm condition by failing to receive an expected polling signal for a predetermined period of time; and
the pet collar automatically activates the first alarm in response to the first alarm condition.

3. The lost pet notification system of claim 1, wherein:
the portable unit detects the second alarm condition by failing to receive expected reply signals to a predetermined number of polling signals; and
the portable unit automatically activates the second alarm in response to the second alarm condition.

4. The lost pet notification system of claim 1, wherein the first alarm is selected from the group consisting essentially of emitting a sound, illuminating a plurality of lights, and displaying a message on a display device.

5. The lost pet notification system of claim 1, wherein the pet collar further comprises:
a global positioning device operative for receiving a global positioning signal; and
a transmission device operative for transmitting information corresponding to the global positioning signal to a monitoring center.

6. The lost pet notification system of claim 5, wherein the transmission device is activated in response to the first alarm condition and wherein a cellular system receiving the transmissions from the pet collar is operative to determine the approximate location of the pet collar based on the transmissions.

7. The lost pet notification system of claim 1, wherein the pet collar further comprises a paging unit and a display device, wherein the paging unit is operative for receiving a paging signal and causing the display device to display information contained in the paging signal.

8. The lost pet notification system of claim 7, wherein the information contained in the paging signal includes a telephone number that may be used to report the location of the missing pet.

9. The lost pet notification system of claim 1, wherein:
the pet collar is further operative to transmit a radio frequency beacon receivable by a mobile unit, and the mobile unit is operative to receive the radio frequency beacon signal and display a homing signal representative of direction and strength information corresponding to the beacon signal.

10. The lost pet notification of claim 1, wherein the base station includes a memory operable for storing a plurality of telephone numbers and a message associated with each telephone number.

11. The lost pet notification of claim 1, wherein the base station contains a telephone line connector for connecting the base station to a telephone, and the base station is programmable by input received through the telephone connector.

12. The lost pet notification of claim 1, wherein:
the base station is operative for receiving a second notification from the portable unit while the portable unit is held within the base station indicating that the pet collar has reestablished communications with the portable unit; and
automatically placing at least one notification communication to the predetermined recipient in response to the second notification indicating that the pet collar has reestablished communications with the portable unit.

13. The lost pet notification system of claim 1, wherein the base station is operative for charging a battery located in the portable unit while the portable unit is held within the base station.

14. In or for a lost pet notification system, a pet collar operative for:
receiving a polling signal;
responding to the polling signal by transmitting a reply signal;
detecting a first alarm condition by failing to receive an expected polling signal for a predetermined period of time; and
automatically activating a first alarm in response to the first alarm condition.

15. The pet collar of claim 14, wherein the first alarm is selected from the group consisting essentially a emitting a sound, illuminating a plurality of lights, and displaying a message on a display device.

16. The pet collar of claim 14, wherein the pet collar further comprises:
a global positioning device operative for receiving a global positioning signal; and
a transmission device operative for transmitting information corresponding to the global positioning signal to a monitoring center.

17. The pet collar of claim 16, wherein the transmission device is activated in response to the first alarm condition and wherein a cellular system receiving transmissions from the pet collar is operative to determine the approximate location of the pet collar based on the transmissions.

18. The pet collar of claim 14, wherein the pet collar further comprises a paging unit and a display device, wherein the paging unit is operative for receiving a paging signal and causing the display device to display information contained in the paging signal.

19. The pet collar of claim 18, wherein the information contained in the paging signal includes a telephone number that may be used to report the location of the missing pet.

20. The pet collar of claim 14, wherein the pet collar is further operative to transmit a radio frequency beacon receivable by a mobile unit, and the mobile unit is operative to receive the radio frequency beacon signal and display a homing signal representative of direction and strength information corresponding to the beacon signal.

21. In or for a lost pet notification system, a monitoring station comprising:
a portable unit operative for transmitting a polling signal to a pet collar when the pet collar is within transmission range of the portable unit, receiving a reply signal from the pet collar when the portable unit is in receiving range of the pet collar, detecting an alarm condition by failing to receive expected reply signals to a predetermined number of polling signals, and automatically activating an alarm in response to the alarm condition; and
a base station configured for removeably holding the portable unit, receiving a first notification of the alarm from the portable unit, and automatically placing at least one telephone call to a predetermined telephone number in response to the second alarm condition.

22. The monitoring station of claim 21, wherein the base station includes a memory operable for storing a plurality of predetermined telephone numbers and a message associated with each predetermined telephone number.

23. The monitoring station of claim 21, wherein the base station contains a telephone line connector for connecting the base station to a telephone, and the base station is programmable by input received through the telephone connector.

24. The monitoring station of claim 21, wherein:

the base station is operative for receiving a second notification from the portable unit while the portable unit is held within the base station indicating that the pet collar has reestablished communications with the portable unit; and automatically placing at least one telephone call to the predetermined telephone number in response to second notification indicating that the pet collar has reestablished communications with the portable unit.

25. The lost pet notification system of claim 21, wherein the base station is operative for charging a battery located in the portable unit while the portable unit is held within the base station.

26. A lost pet notification system, comprising:

a pet collar operative for receiving a polling signal, responding to the polling signal by transmitting a reply signal, detecting a first alarm condition by failing to receive an expected polling signal for a predetermined period of time, and automatically activating the first alarm in response to the first alarm condition;

a portable unit operative for transmitting the polling signal to the pet collar when the pet collar is within transmission range of the portable unit, receiving the reply signal from the pet collar when the portable unit is in receiving range of the pet collar, detecting a second alarm condition by failing to receive an expected reply signals to a predetermined number of polling signals, and automatically activating a second alarm in response to the second alarm condition; and a base station configured for removeably holding the portable unit, receiving a notification of the second alarm from the portable unit, and automatically placing at least one telephone call to a predetermined telephone number in response to the second alarm condition.

27. The lost pet notification system of claim 26, wherein the pet collar further comprises:

a global positioning device operative for receiving a global positioning signal; and a transmission device operative for transmitting information corresponding to the global positioning signal to a monitoring center.

28. The lost pet notification system of claim 27, wherein:

the transmission device is activated in response to the first alarm condition and wherein a cellular system receiving transmissions from the pet collar is operative to determine the approximate location of the pet collar based on the transmissions.

29. The lost pet notification system of claim 28, wherein the pet collar further comprises a paging unit and a display device, wherein the paging unit is operative for receiving a paging signal and causing the display device to display information contained in the paging signal.

30. The lost pet notification system of claim 29 wherein the information contained in the paging signal includes a telephone number that may be used to report the location of the missing pet.

31. The lost pet notification system of claim 30, wherein:

the pet collar further operative to transmit a radio frequency beacon receivable by a portable unit that is operative to receive the radio frequency beacon signal and display a homing signal representative of direction and strength information corresponding to the beacon signal.

32. The lost pet notification of claim 26, wherein:

the base station is operative for receiving a second notification from the portable unit while the portable unit is held within the base station indicating that the pet collar has reestablished communications with the portable unit; and automatically placing at least one telephone call to the predetermined telephone number in response to the second notification indicating that the pet collar has reestablished communications with the portable unit.

33. The lost pet notification system of claim 26, wherein the base station is operative for charging a battery located in the portable unit while the portable unit is held within the base station.

* * * * *